(12) United States Patent
Kato et al.

(10) Patent No.: US 6,355,986 B1
(45) Date of Patent: Mar. 12, 2002

(54) GENERATOR SET CONTROL APPARATUS AND METHOD TO AVOID VEHICLE RESONANCES

(75) Inventors: Daniel J. Kato, Blaine; Steve N Seidlitz, Sunfish Lake, both of MN (US)

(73) Assignee: Onan Corporation, Minneapolis, MN (US)

( * ) Notice: Subject to any disclaimer, the term of this patent is extended or adjusted under 35 U.S.C. 154(b) by 13 days.

(21) Appl. No.: 09/596,168

(22) Filed: Jun. 16, 2000

Related U.S. Application Data

(63) Continuation-in-part of application No. 09/055,603, filed on Apr. 6, 1998, now abandoned.

(51) Int. Cl.[7] .......................... F02B 75/06; F02D 13/02
(52) U.S. Cl. ............................. 290/40 C; 123/192.1; 123/179.3
(58) Field of Search .................. 290/40 R, 40 A, 290/40 C, 40 E; 322/14; 123/192.1, 179.3

(56) References Cited

U.S. PATENT DOCUMENTS

| | | | |
|---|---|---|---|
| 4,215,404 A | | 7/1980 | Bukhtiyarov et al. ....... 364/431 |
| 4,819,182 A | * | 4/1989 | King et al. .................. 364/508 |
| 4,943,776 A | | 7/1990 | Polito et al. ................. 324/391 |
| 5,060,618 A | * | 10/1991 | Takaoka et al. ............. 123/436 |
| 5,105,776 A | * | 4/1992 | Tsuchiya et al. .......... 123/192.1 |
| 5,119,783 A | * | 6/1992 | Komurasaki ................. 123/425 |
| 5,186,136 A | * | 2/1993 | Kadomukai et al. ...... 123/192.1 |
| 5,200,899 A | | 4/1993 | Ribbens et al. ......... 364/431.08 |
| 5,270,575 A | * | 12/1993 | Togai et al. ............... 290/40 C |
| 5,343,843 A | * | 9/1994 | Hamren ...................... 123/425 |
| 5,390,545 A | | 2/1995 | Doan .......................... 73/650 |
| 5,483,936 A | * | 1/1996 | Kerstein et al. ............. 123/425 |
| 5,619,956 A | * | 4/1997 | Koziara et al. ........... 123/41.31 |
| 5,726,558 A | | 3/1998 | Umeda et al. ................ 322/27 |
| 5,742,498 A | * | 4/1998 | Taniguchi et al. ........... 363/145 |
| 5,909,720 A | * | 6/1999 | Yamaoka et al. ......... 123/179.3 |
| 6,286,473 B1 | * | 9/2001 | Zaremba .................. 123/192.1 |

* cited by examiner

Primary Examiner—Nicholas Ponomarenko
(74) Attorney, Agent, or Firm—Schwegman, Lundberg, Woessner & Kluth, P.A.

(57) ABSTRACT

A generator set control system for minimizing vehicle noise and vibration. The system has sensors at different locations in a vehicle, a generator set with a generator set speed controller, and a system controller operatively connected to the sensors and to the generator set speed controller. Noise and vibrations are measured by the sensors during startup of the generator set, and the system controller determines which generator set speeds are to be avoided. Optionally, a steady state measurement may be used to determine undesirable generator set speeds. The generator set speed controller is commanded to make the generator set avoid the speeds mentioned. The system may be mounted permanently to the vehicle for subsequent measurements as needed.

27 Claims, 2 Drawing Sheets

GENERATOR SET CONTROL APPARATUS AND METHOD TO AVOID VEHICLE RESONANCES

RELATED APPLICATIONS

This application is a continuation-in-part of U.S. patent application Ser. No. 09/055,603, filed on Apr. 6, 1998 abandoned.

TECHNICAL FIELD

The present invention relates to a method and apparatus for minimizing vehicle noise and vibration due to generator set noise and vibration.

BACKGROUND OF THE INVENTION

A common problem one faces in reducing vehicle noise and vibration produced by an electrical generator set and particularly when use in a recreational vehicle (RV) is that of vehicle resonance. A generator set typically includes an engine and generator. The engine and the generator both contain rotating parts, and they are generally a major source of noise and vibrations exciting resonant responses. When generator sets are installed, the vehicles respond in many different ways depending on their material properties and geometry. These factors govern the vehicle's structural and acoustic natural frequencies. When a generator set produces a forcing frequency that is at or near one of the vehicle's natural frequencies, a resonant response occurs amplifying the generator set's noise and vibration. Resonances can often account for increases in overall interior RV sound levels of 10 dB or more, and much more at individual frequencies.

In conventional generator set installations, particularly RV generator set installations, resonant behaviors are difficult to avoid in the large and varied population of vehicles. That is, even if a generator set is quiet in one vehicle, the same generator set running at the same speed may cause noise and vibration in another vehicle. Furthermore, a different generator set in the second vehicle may be perfectly acceptable since it may have different excitation frequencies than the first generator set because of different cylinder arrangement and/or speed. Thus, one generator set design, even if it is of variable speed, cannot be universally quiet in all applications or vehicles if there is no knowledge of where the vehicle natural frequencies occur. In this regard, RV builders will often switch generator sets in a given RV application rather than modify their coach to accommodate a generator set witch causes more vehicle noise and vibration.

Conventional attempts at reducing vehicle resonance include manually adjusting the generator set, varying the placement or location of the generator set within the vehicle, and even changing the RV structure itself. Attempts to provide a generator set which will minimize resonance in all vehicles, include utilizing very soft or double mounting systems so as to somewhat isolate the generator set from the vehicle.

The present invention provides a method and apparatus which minimizes vehicle noise and vibration due to generator set noise and vibration thereby allowing a single generator set design to be used in all types of RV structures.

SUMMARY OF THE INVENTION

The present invention relates to a method and apparatus for minimizing vehicle vibration and noise due to generator set vibration and noise.

One embodiment provides a generator set control system for minimizing vehicle noise and vibration due to generator set noise and vibration. The system comprises one or more sensors disposed in the vehicle, a system controller operatively connected to the sensors and including logic, and a generator set speed controller operatively connected to the generator set. The system controller receives signals from the sensors during startup and operation of the generator set and compares the signals to threshold levels stored in the system controller. The system controller correlates the signals to the generator set speeds, thereby determining which generator set speeds to avoid so as to minimize vehicle noise, vehicle vibration, or a combination of vehicle noise and vehicle vibration. The generator set speed controller controls the generator set to avoid the determined generator set speeds.

In an embodiment of the generator set control system, the sensors and the system controller are permanently mounted in the vehicle. Thus, the system may be used whenever weight characteristics or acoustic properties of the vehicle change.

In another embodiment of the generator set control system, the threshold level may be altered by the operator to select a tolerable level of vehicle noise, vehicle vibration, or a combination of vehicle noise and vehicle vibration.

Another embodiment provides a method for minimizing vehicle noise and vehicle vibration due to generator set noise and vibration. The method comprises measuring vehicle noise and/or vehicle vibration at one or more locations in the vehicle during startup of the generator set, determining which generator set speeds to avoid by comparing the vehicle noise and/or vehicle vibration to threshold levels and correlating the noise and vibration to the generator set speeds during startup, and controlling the generator set to avoid the determined generator set speeds.

In an embodiment of the method, the measurement of vehicle noise and/or vehicle vibration and the comparison to threshold levels is used to control generator sets in other vehicles of the same model to avoid the determined generator set speeds.

In an embodiment of the method, the measuring of vehicle noise and/or vehicle vibration and determining which generator set speeds to avoid is performed every time the generator set is operated, to minimize vehicle noise and/or vehicle vibration in relation to the vehicle's present weight and acoustic characteristics.

Another embodiment of the method provides a method for minimizing vehicle resonance due to generator set noise and vibration where vehicle noise and/or vehicle vibration are measured when a generator set is operated at one generator set speed for a period of time. The frequencies where average vehicle noise and/or average vehicle vibration is higher than stored threshold levels are identified and the frequencies are correlated to generator set speeds. The generator set is then controlled to avoid at least some of the generator set speeds, whereby upon subsequent startups and operation of the generator set, vehicle noise and/or vehicle vibration, caused by vehicle resonance, for example, is minimized.

It is an advantage of one embodiment that vehicle noise and/or vehicle vibration may be minimized by avoiding particular generator set speeds. A permanently mounted embodiment has the advantage that the threshold levels may be altered at will, and furthermore that the generator set may be set to avoid different speeds as the structural and acoustic properties of the vehicle change.

These and various other advantages and features of novelty which characterize the present invention are pointed out with particularity in the claims annexed hereto and forming a part hereof. However, for a better understanding of the present invention, its advantages, and other objects obtained by its use, reference should be made to the drawings which form a further part hereof, and to the accompanying descriptive matter, in which preferred embodiments of the present invention are illustrated and described.

DETAILED DESCRIPTION OF PREFERRED EMBODIMENTS

Figure 1:
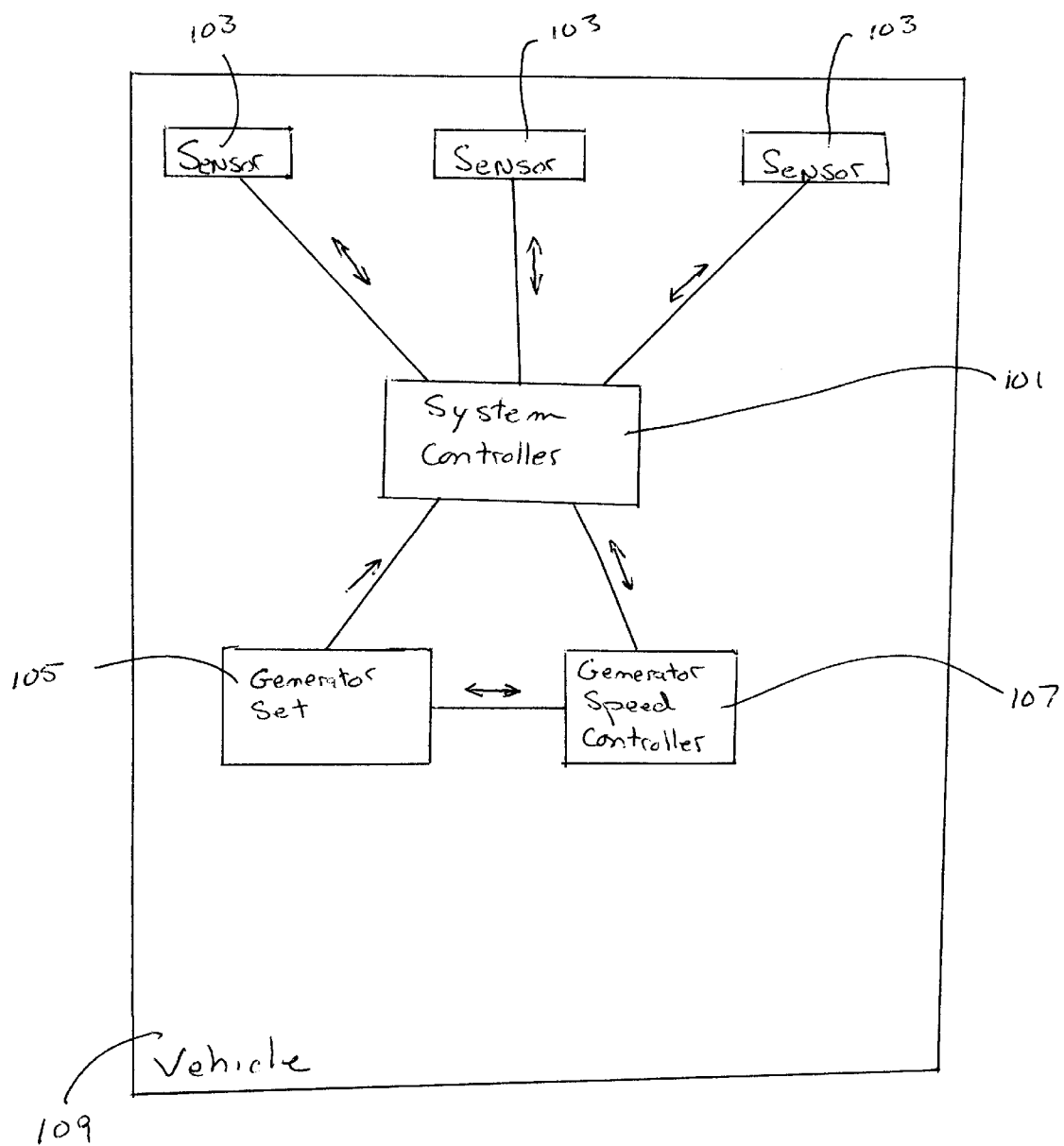
FIG. 1 is a schematic view of an embodiment of the generator set control system according to the invention.

In FIG. 1 there is schematically illustrated an embodiment of a generator set control system. The generator set control system 100 comprises a system controller 101, connected to sensor 103, to a generator set 105, and to a generator set speed controller 107. The system controller 101 includes logic, whereby it may compare output signals from the sensor 103, with values of generator set speeds, transmitted to the system controller 101 from the generator set 105. For these and other purposes, the system controller 101 may comprise circuitry, input and output devices, memory, processors, and other components which typically are present in a system controller. The system controller 101 is able to run at least a basic algorithm which will be further described below.

The sensors 103 are connected to the system controller 101 and are disposed on different locations in the vehicle 109. The sensors 103 are capable of sensing vehicle noise and/or vehicle vibration in the location where it is situated, and produce an output signal to the system controller 101, which output signal contains information on the level of vehicle noise and/or vehicle vibration sensed by the sensor 103. For example while sensing vehicle noise and/or vehicle vibration, the sensor 103 may output a continuous signal to the system controller 101, which signal contains information on the amplitude of the vehicle noise and/or vehicle vibration. The sensors 103 may deliver amplitude information and/or a frequency spectrum. The sensors may output a frequency spectrum with amplitudes for different frequencies of vehicle noise and/or vehicle vibration. To keep sensor costs down, however, the sensors will most likely just provide amplitude information versus time. For example, the sensors 103 are microphones, vibration transducers, or a combination of microphones and vibration transducers. In addition, other types of sensors that sense sound, vibration, or a combination of sound and vibration may be used.

The generator set 105 typically includes an engine and a generator, mounted to the vehicle. Optionally, the generator set 105 may be permanently mounted to the vehicle. For example, an RV may comprise a generator set for producing electric power. Many commercially available generator sets may be used with this embodiment. The generator set 105 is connected to the system controller 101. The connection may be used to provide a system controller with information on the speed at which the generator set 105 is operating at the time. As noted above, the engine is generally the major source of noise and vibrations. Accordingly, the speed of the engine in the generator set 105 may be provided to the system controller. This output signal may be provided by, for example, the engine of the generator set producing an output signal with information on the operating speed of the generator set 105. Alternatively, a measuring device may be mounted on the generator set for determining the actual speed of the generator set and for outputting the signal to the system controller 101.

During operation, the generator set 105 will produce mechanical vibrations. The mechanical vibrations will spread to the rest of the vehicle through the part of the vehicle where the generator set 105 is mounted, and also through noise (vibrations in the air) surrounding the generator set 105. The noise and vibrations produced by the generator set 105 cause vehicle noise and vehicle vibrations that will be detected by the sensors 103 in various positions inside the vehicle. It should be noted that in order to provide as reliable and relevant a measurement as possible, the sensors 103 should be positioned at such places in the vehicle that the best measurement of the vehicle noise and/or vehicle vibration is obtained. If a large enough number of sensors 103 is used, there is no problem in distributing them evenly throughout the vehicle to assure that the most accurate measurement is obtained. However, using more sensors 103 requires the system controller 101 to handle much more information. It may be desirable, therefore, to keep the number of sensors 103 relatively low, and make sure that they are positioned such that the most accurate measurement is obtained. For example, it may be desirable to place the sensors where passengers or drivers in the vehicle would typically experience vehicle noise and/or vehicle vibrations, such as near or on seats, beds, tables, or the floor.

The generator set control system 100 further comprises a generator set speed controller 107, operatively connected to the generator set 105. The generator set speed controller 107 may receive commands from the system controller 101 on how to control the speed of the generator set 105. The generator set speed controller 107 is capable of receiving information from the system controller 101 as to which operating speeds are to be avoided, and capable of controlling the generator set 105 to avoid the same operating speeds.

In using an embodiment of the present invention, the sensors 103 are positioned in different places in the vehicle as noted above. The sensors 103 are connected to the system controller 101. The generator set speed controller 107 is connected to the generator set 105 and also to the system controller 101. The generator set 105 is connected to the system controller 101 and the generator speed controller 107. When the system is ready for measurement, the generator set 105 is started and run through all its operating speeds to its maximum operating speed. During the operation of the generator set 105, the sensors 103 are sensing vehicle noise and/or vehicle vibration throughout the vehicle, due to the generator set. The sensors 103 are outputting information on the vehicle noise and/or vehicle vibration to the system controller 101. In the description of using this embodiment the measurement of vehicle noise and/or vehicle vibration is performed during startup of the generator set. It should be noted that this is believed to be desirable because the generator set will start from zero speed and accelerate to its maximum speed, and therefore a measurement of the vehicle noise and/or vehicle vibration during a sweep of all generator set speeds can be obtained. However, vehicle noise and/or vehicle vibration may occur also during normal operation of the generator set and not only during startup, whereby the system provides minimizing of vehicle noise and/or vehicle vibration which benefits the use of the generator set at any time.

The system controller 101 analyzes output data from the sensors 103 while measurement is being taken, or stores the measured information and analyze it after the measuring operation of the generator set is finished. Different criteria may be used in determining which generator set speeds are to be avoided. For example, the system controller can be provided with a threshold level for the output values from the sensors 103, such as a noise or sound level in dB, or a mechanical vibration level. This threshold level may be adjustable by the factory installing the generator set and/or by the user. Levels detected by the sensors that are above the threshold limit will be regarded as pertaining to an operating speed of the generator set that should be avoided. Alternatively, the system controller 101 may store the output values from the sensors 103 throughout the measurement, and afterwards analyze the stored data to determine if there are unacceptably high peaks in the vehicle noise and/or vehicle vibration.

The system controller 101 also receives information on the operating speed of the generator set 105 during the measurement. This information is handled in a similar way to the output signals form the sensors. If, for example, the system controller analyses the sensor output data continuously, the generator set speed information may be accessed by the system controller when an unacceptable vehicle noise and/or vehicle vibration level is detected, in order that the current generator set speed may be avoided in the future. Alternatively, the system controller may store the generator set speed information and the sensor output information such that, when the sensor output information is analyzed and an unacceptable vehicle and/or vehicle vibration level is found, the generator set speed causing that level can be identified.

When the system controller 101 has determined which generator set speeds should be avoided, this information is output to the generator set speed controller 107. The next time the generator set 105 is operated, the generator set speed controller 107 will control the generator set 105 to avoid the operating speeds thus determined.

Figure 2:
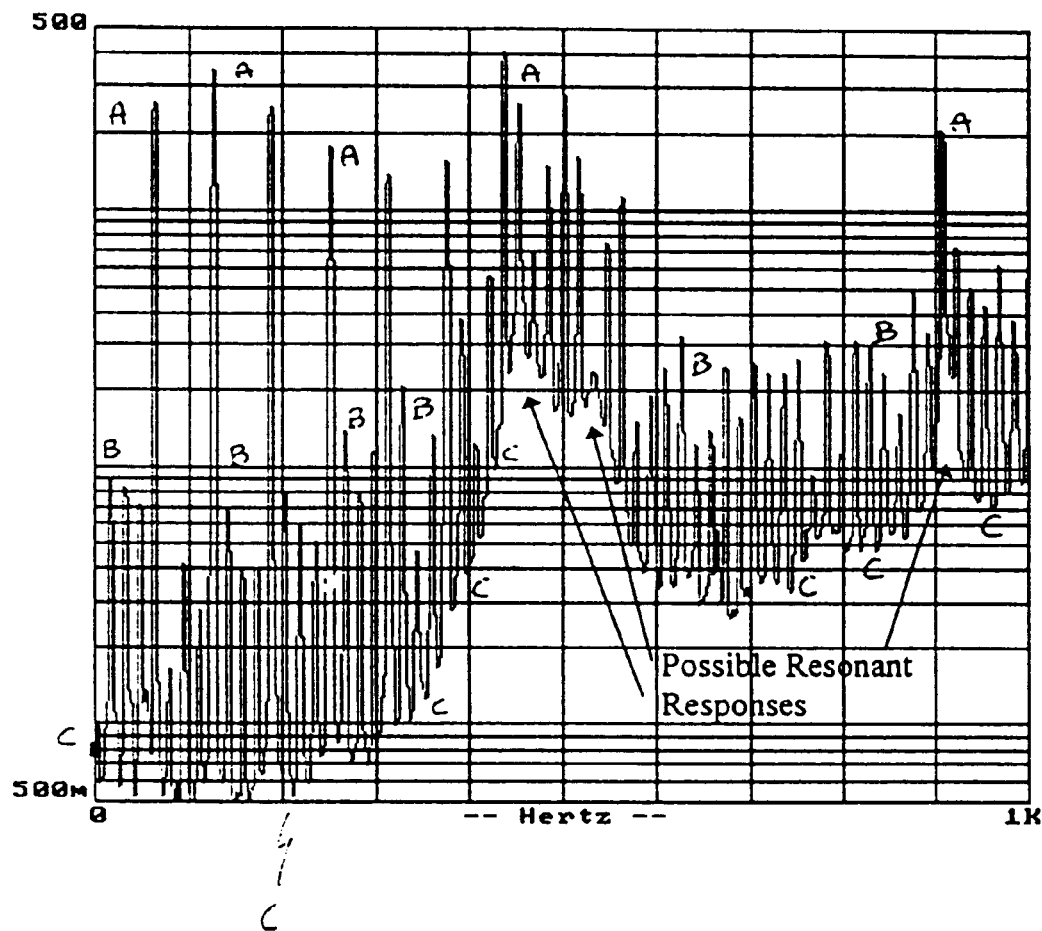
FIG. 2 is a diagram illustrating a steady state average spectrum for a particular generator set.

If the data collected by the sensors 103 has a high dynamic range, such that they can register vehicle vibration and/or vehicle noise in a relatively broad frequency spectrum, it may be possible to find resonant responses in the vehicle without running a speed sweep. FIG. 2 is an exemplary diagram showing a steady state average spectrum. A steady state average spectrum can be obtained by making measurements over a time period with a particular generator set in a particle vehicle. The actual steady state average spectrum resulting from measurements on for example an RV will be more complex than the diagram in FIG. 2. However, the general description of the spectrum which is given below applies also to RV spectrums and the indications of which frequencies receive resonant responses will appear in similar ways in either kind of spectrum.

The horizontal axis is the frequency range registered by the sensors on a linear scale, in this example it ranges between zero and 1 KHz. The vertical axis is the average amplitude of vehicle vibration and/or vehicle noise on a logarithmic scale, measured in an arbitrary amplitude unit. Because of the relatively high dynamic range of the sensors used, the spectrum may contain information which helps identify resonant frequencies in the vehicle.

The diagram shows a great number of tall peaks, generally indicated by A in FIG. 2. The tall peaks A are interspersed by shorter peaks B and "pits" C, in which the measurement on average has a local minimum. A general description of the causes of vibrations recorded as peaks, A, B and the pits C may be given as follows. An engine running at a particular speed will vibrate at all frequencies corresponding to whole and half multiples of the engine frequency. Each of these vibration modes is called an order. For example, a second order is a vibration mode at twice the engine frequency. The number of engine cylinders, how they are geometrically arranged relative to each other, and their firing sequence, will determine which orders tend to be large and which orders tend to be small. Each of the peaks A and B is an engine order. Theoretically, there are no vibrations between engine orders. However, due to measuring errors, combustion variations and mechanical clearances, vibrations will occur between the engine orders. The amplitude of these vibrations is detected as pits C in the diagram.

As is seen in the diagram, the amplitude at the pits C appears to vary along a recognizable curve across the frequency range, which curve forms a lower boundary for the measured amplitudes. The frequency ranges where the curve has maximums, i.e. where the pits C have amplitudes relatively higher than elsewhere are indicated with arrows in the diagram. One possible interpretation of the maximums is that, even when averaging over a period of time, the vehicle will exhibit noise and vibrations at this frequency with a relatively high amplitude. At these frequencies there is a chance that there is resonant response in the vehicle.

An algorithm in the system controller 101 can be used to identify the frequencies as described above. In order to relate thus-identified frequencies to the corresponding generator set speeds, the system controller may use the measurement results obtained during a speed sweep, carried out for example during startup. Once the undesirable generator set speeds are identified, they can be avoided during operation substantially as described earlier.

The characteristics of generator sets may vary between two generator sets of the same make and model. Also, the same generator set may produce quite different vehicle noise and/or vehicle vibration characteristics when mounted in two different vehicles. Due to this, it is expected that the method and apparatus of the invention may be used in different ways. Preferably, the measurement performed on a generator set mounted in a vehicle of a particular model, can be applied to every identical generator set mounted in a vehicle of the same model. However, as noted above, this may not always work satisfactorily. It may be desirable to perform a measurement for each vehicle with its particular generator set mounted. The differences in the structural properties and acoustics characteristics between different generator sets and/or the same differences between different vehicles would then be compensated for by the individual measurement.

However, even if the vehicle noise and/or vehicle vibration level of a particular vehicle has been minimized using the apparatus and/or method, it is expected that the structural properties and/or acoustic characteristics of the vehicle and the generator set may vary from time to time. For example, different loads of passengers and luggage in the vehicle may alter the characteristics in a way such that unwanted vehicle noise and/or vehicle vibration re-occurs despite the avoided generator set speeds. It may be desirable to repeat the measurement and again determine which generator set speeds should be avoided to minimize vehicle and/or vehicle vibrations. It would be possible, yet inconvenient, for the owner of the vehicle to return to a service station which has a generator set control system to have the measurements repeated. It is more convenient if the generator set control system is permanently mounted in the vehicle, such that the measurement of vehicle and/or vehicle vibrations and the controlling of the generator set to avoid certain generator set speeds may be done at will by the owner or operator of the vehicle.

Another embodiment of the system therefore includes the sensors and the system controller being permanently mounted to the vehicle and connected to the other components as described above. The operator of the vehicle may then run a measurement wherever they experience unwanted vehicle noise and/or vehicle vibration in the vehicle while operating the generator set. Optionally, the permanently mounted generator set control system may be set to run a measurement every time the generator set is started up. After the starting up, when the generator set is operating, the generator set speeds to be avoided have been determined by the system controller 101 and output to the generator set speed controller 107, whereby the generator set 105 will avoid these generator set speeds.

Another feature which may be included is that the system controller 101 can run measurement of vehicle noise and/or vehicle vibration during normal operation. To make the measurement as complete as possible, it is preferable that the system controller can perform a sweep over the generator set speeds during the measurement. To facilitate the sweep over the generator set speeds, it may be desirable to keep the overall load on the generator low at the time of measurement.

The embodiment may also feature a possibility of selecting different settings of the threshold levels. For example, it may be desirable to set the threshold levels different during the daytime and nighttime. During nighttime, the operator may prefer to have the generator set running as silently as possible, that is, with a very low minimum of vehicle noise and/or vehicle vibration. This can be obtained by setting the threshold level very low. It is expected that this will cause a greater number of generator set speeds to be avoided, which probably sets a limit to the operational performance of the generator set. However, the power use is typically reduced during nighttime, when the operator can turn off most power appliances except perhaps for an air conditioner and a refrigerator etc. On the other hand, during daytime the need for electric power is usually increased and the operator may wish to set the threshold level higher such that the generator set can run at more generator set speeds than during nighttime without causing an unacceptable amount of vehicle noise and/or vehicle vibration.

It is to be understood that even though numerous characteristics and advantages of the present invention have been set forth in the foregoing description, together with details of the structure and function of the invention, the disclosure contained herein is illustrative, and changes in matters of order, shape, size and arrangement of parts and of steps may be made within the principles of the present invention and to the full extent indicated by the broad general meaning of the terms in which the appended claims are expressed.

We claim:

1. A generator set control system comprising:
    one or more sensors disposed in a vehicle, the sensors sensing vehicle noise levels and providing output signals indicative of the vehicle noise levels sensed by the sensors;
    a system controller operatively connected to the sensors for receiving the output signals from the sensors and operatively connected to a generator set for receiving signals indicative of the generator set speeds of the generator set;
    the system controller including logic comparing the sensed noise levels to threshold noise levels stored in the system controller, correlating the sensed noise levels to generator set speeds, and determining which generator set speeds to avoid so as to minimize noise; and
    a generator set speed controller being operatively connected to the generator set, the system controller providing commands to the generator set speed controller on generator set speeds to be avoided.

2. The generator set control system of claim 1, wherein the sensors and the system controller are permanently mounted to the vehicle to facilitate use of the system whenever needed.

3. The generator set control system of claim 1 further comprising one or more additional sensors disposed in a vehicle, the additional sensors sensing vehicle vibration levels and providing output signals indicative of the vehicle vibration levels sensed by the additional sensors;
    wherein the system controller operatively connects to the additional sensors for receiving the output signals from the additional sensors; and
    wherein the system controller includes logic comparing the sensed vibration levels to threshold vibration levels stored in the system controller, correlating the sensed vibration levels to generator set speeds, and determining which generator set speeds to avoid so as to minimize vibration.

4. A generator set control system comprising:
    one or more sensors disposed in a vehicle, the sensors sensing vehicle vibration levels and providing output signals indicative of the vehicle vibration levels sensed by the sensors;
    a system controller operatively connected to the sensors for receiving the output signals from the sensors and operatively connected to a generator set for receiving signals indicative of the generator set speeds of the generator set;
    the system controller including logic comparing the sensed vibration levels to threshold vibration levels stored in the system controller, correlating the vibration levels to generator set speeds, and determining which generator set speeds to avoid so as to minimize vibration; and
    a generator set speed controller being operatively connected to the generator set, the system controller providing commands to the generator set speed controller on generator set speeds to be avoided.

5. The generator set control system of claim 1, wherein the sensors and the system controller are permanently mounted to the vehicle to facilitate use of the system whenever needed.

6. The generator set control system of claim 1 further comprising one or more additional sensors disposed in a vehicle, the additional sensors sensing vehicle noise levels and providing output signals indicative of the vehicle noise levels sensed by the additional sensors;
    wherein the system controller operatively connects to the additional sensors for receiving the output signals from the additional sensors; and
    wherein the system controller includes logic comparing the sensed noise levels to threshold noise levels stored in the system controller, correlating the sensed noise levels to generator set speeds, and determining which generator set speeds to avoid so as to minimize noise.

7. A method for minimizing vehicle noise in a vehicle due to generator set noise and vibration, comprising:

measuring vehicle noise at one or more locations in a vehicle during operation of a generator set attached to the vehicle;

determining which generator set speeds to avoid by comparing the vehicle noise to stored threshold noise levels and correlating the vehicle noise to the generator set speeds during operation; and controlling the generator set to avoid the determined generator set speeds.

8. The method of claim 7 further comprising performing the method during startup of the generator set.

9. The method of claim 7, further comprising controlling identical generator sets in other vehicles of the same model to avoid the determined generator set speeds.

10. The method of claim 7, further comprising performing the method every time the generator set is operated, to minimize vehicle noise regardless of changes in the weight and structural characteristics of the vehicle.

11. The method of claim 7, wherein the measuring vehicle noise comprises using at least one sensor.

12. The method of claim 11, wherein the measuring vehicle noise comprises using sensors permanently mounted in the vehicle.

13. The method of claim 7, wherein determining which generator set speeds to avoid comprises using a system controller including logic.

14. The method of claim 13, wherein determining which generator set speeds to avoid comprises using a system controller permanently mounted to the vehicle.

15. The method of claim 7, wherein controlling the generator set to avoid the determined generator set speeds comprises using a generator set speed controller operatively connected to the generator set.

16. The method of claim 7 further comprising measuring vehicle vibration at one or more locations in the vehicle during operation of the generator set; and determining which generator set speeds to avoid by comparing the vehicle vibration to stored threshold vibration levels and correlating the vehicle vibration to the generator set speeds during operation.

17. A method for minimizing vehicle vibration in a vehicle due to generator set noise and vibration, comprising:

measuring vehicle vibration at one or more locations in a vehicle during operation of a generator set attached to the vehicle;

determining which generator set speeds to avoid by comparing the vehicle vibration to stored threshold vibration levels and correlating the vehicle vibration to the generator set speeds during operation; and controlling the generator set to avoid the determined generator set speeds.

18. The method of claim 17, further comprising performing the method every time the generator set is operated, to minimize vehicle vibration regardless of changes in the weight and structural characteristics of the vehicle.

19. The method of claim 17, wherein the measuring vehicle vibration comprises using at least one sensor.

20. The method of claim 19, wherein the measuring vehicle vibration comprises using sensors permanently mounted in the vehicle.

21. The method of claim 17 further comprising measuring vehicle noise at one or more locations in the vehicle during operation of the generator set; and determining which generator set speeds to avoid by comparing the vehicle noise to stored threshold noise levels and correlating the vehicle noise to the generator set speeds during operation.

22. A method for minimizing vehicle noise due to generator set noise and vibration, comprising:

measuring vehicle noise at one or more locations in a passenger compartment of a vehicle when operating a generator set attached to the vehicle at one generator set speed for a period of time;

identifying frequencies where average vehicle noise is higher than stored vehicle noise threshold levels;

correlating the frequencies to generator set speeds; and controlling the generator set to avoid at least some of the generator set speeds.

23. The method of claim 22, wherein the correlating the frequencies to generator set speeds includes using measurements obtained during a sweep through all generator set speeds.

24. The method of claim 22 further comprising measuring vehicle vibration at one or more locations in the passenger compartment of the vehicle; and identifying frequencies where average vehicle vibration is higher than stored vehicle vibration threshold levels.

25. A method for minimizing vehicle vibration due to generator set noise and vibration, comprising:

measuring vehicle vibration at one or more locations in a passenger compartment of a vehicle when operating a generator set attached to the vehicle at one generator set speed for a period of time;

identifying frequencies where average vehicle vibration is higher than stored vehicle vibration threshold levels;

correlating the frequencies to generator set speeds; and controlling the generator set to avoid at least some of the generator set speeds.

26. The method of claim 25, wherein the correlating the frequencies to generator set speeds includes using measurements obtained during a sweep through all generator set speeds.

27. The method of claim 26 further comprising measuring vehicle noise at one or more locations in the passenger compartment of the vehicle; and identifying frequencies where average vehicle noise is higher than stored vehicle noise threshold levels.

* * * * *